(12) United States Patent
Eguchi

(10) Patent No.: US 9,976,618 B2
(45) Date of Patent: May 22, 2018

(54) CYLINDRICAL VIBRATION-DAMPING DEVICE

(71) Applicant: SUMITOMO RIKO COMPANY LIMITED, Komaki-shi, Aichi (JP)

(72) Inventor: Shimpei Eguchi, Konan (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 0 days. days.

(21) Appl. No.: 14/688,183

(22) Filed: Apr. 16, 2015

(65) Prior Publication Data

US 2015/0219175 A1    Aug. 6, 2015

Related U.S. Application Data

(63) Continuation of application No. PCT/JP2013/075935, filed on Sep. 25, 2013.

(51) Int. Cl.
*F16F 1/38* (2006.01)

(52) U.S. Cl.
CPC ............ *F16F 1/38* (2013.01); *F16F 1/3863* (2013.01)

(58) Field of Classification Search
CPC .......... B60G 7/006; B60G 11/12; B60G 3/06; B60G 7/02; B60G 2204/14; B60G 2204/41; B60G 2204/143; B60G 2204/416; B60G 2204/4104; B60G 2206/50; F16F 1/387; F16F 1/3835; F16F 1/3828; F16F 1/3863; B29D 33/00; Y10T 29/49622; B29K 2007/00
USPC ...................................... 267/141, 141.7, 153
See application file for complete search history.

(56) References Cited

U.S. PATENT DOCUMENTS

| 4,392,542 A | 7/1983 | Aiba | |
|---|---|---|---|
| 4,700,934 A * | 10/1987 | Andra | F16F 13/14 |
| | | | 267/140.12 |
| 4,958,811 A * | 9/1990 | Brenner | F16F 13/1409 |
| | | | 267/140.12 |

(Continued)

FOREIGN PATENT DOCUMENTS

| EP | 0 075 807 A2 | 4/1983 |
|---|---|---|
| EP | 1291544 | * 3/2003 |

(Continued)

OTHER PUBLICATIONS

Jan. 7, 2014 International Search Report issued in International Application No. PCT/JP2013/075935.

(Continued)

*Primary Examiner* — Robert A. Siconolfi
*Assistant Examiner* — San Aung
(74) *Attorney, Agent, or Firm* — Oliff PLC

(57) ABSTRACT

A cylindrical vibration-damping device including: an inner axial member; an outer cylindrical member; and a main rubber elastic body connecting the inner axial member and the outer cylindrical member. A pair of protruding portions are provided that protrude from the inner axial member on both sides thereof in an axis-perpendicular direction, and each protruding portion has a tapered shape thinning out toward its tip, and elastic connecting portions are constituted by the main rubber elastic body that connect both faces in a thickness direction of each protruding portion of the inner axial member to respective opposing faces of the outer cylindrical member.

8 Claims, 5 Drawing Sheets

(56) References Cited

U.S. PATENT DOCUMENTS

| | | | | |
|---|---|---|---|---|
| 5,024,425 | A | * | 6/1991 | Schwerdt ............ F16F 13/1481 180/312 |
| 5,123,634 | A | * | 6/1992 | Schwerdt ............ F16F 13/1481 267/140.12 |
| 5,190,269 | A | * | 3/1993 | Ikeda ...................... F16F 1/387 267/140.12 |
| 5,769,399 | A | * | 6/1998 | Fiedler ................ F16F 13/1418 267/140.11 |
| 6,189,874 | B1 | * | 2/2001 | Carlson ................. F16F 1/3842 248/638 |
| 6,616,130 | B2 | * | 9/2003 | Hokazono .............. F16F 1/3814 267/140.5 |
| 2009/0179362 | A1 | * | 7/2009 | Ebert .................... F16F 1/3828 267/293 |
| 2012/0001398 | A1 | | 1/2012 | Darcy-Sharma |

FOREIGN PATENT DOCUMENTS

| | | |
|---|---|---|
| EP | 1291544 A1 * | 3/2003 |
| JP | S57-65243 U | 4/1982 |
| JP | S57-112148 U | 7/1982 |
| JP | S57-114792 U | 7/1982 |
| JP | S63-142441 U | 9/1988 |
| JP | H04-42937 U | 4/1992 |
| JP | H05-126185 A | 5/1993 |
| JP | H06-33965 A | 2/1994 |
| JP | H11-117973 A | 4/1999 |
| JP | 2000-280717 A | 10/2000 |
| JP | 2009-168244 A | 7/2009 |
| JP | 2010-038243 A | 2/2010 |
| JP | 2010-048293 A | 3/2010 |

OTHER PUBLICATIONS

Mar. 29, 2016 International Preliminary Report on Patentability issued in International Patent Application No. PCT/JP2013/075935.
Nov. 7, 2016 Office Action issued in Chinese Patent Application No. 201380070576.9.
Oct. 4, 2016 Office Action issued in Japanese Patent Application No. 2015-538688.
Mar. 14, 2016 Office Action issued in Chinese Patent Application No. 201380070576.9.
Jul. 1, 2016 Office Action issued in Japanese Patent Application No. 2015-538688.

* cited by examiner

CYLINDRICAL VIBRATION-DAMPING DEVICE

INCORPORATED BY REFERENCE

This is a Continuation of International Application No. PCT/JP2013/075935 filed on Sep. 25, 2013, the disclosure of which including the specification, drawings and abstract is incorporated herein by reference in its entirety.

BACKGROUND OF THE INVENTION

1. Field of the Invention

The present invention relates to a cylindrical vibration-damping device used, for example, in a differential mount or a roll mount of a motor vehicle.

2. Description of the Related Art

Conventionally, there has been known a vibration damping device interposed between the members constituting a vibration transmission system to connect the members to each other in a vibration damping manner, one kind of which is the cylindrical vibration-damping device. The cylindrical vibration-damping device, as described in Japanese Unexamined Patent Publication Nos. JP-A-5-126185 and JP-A-11-117973, and U.S. Pat. No. 6,616,130, for example, has a structure where an inner axial member and an outer cylindrical member are arranged to be inserted internally and externally, while the inner axial member and the outer cylindrical member are elastically connected to each other by a main rubber elastic body.

Meanwhile, the cylindrical vibration-damping device is sometimes required to have different vibration damping characteristics in multiple axis-perpendicular directions. Therefore, as shown in JP-A-5-126185, JP-A-11-117973, and U.S. Pat. No. 6,616,130 mentioned above, it is proposed to set a higher spring ratio in the axis-perpendicular directions perpendicular to the main vibration input direction where higher spring characteristics are required by means of forming slits on both sides of the inner axial member.

However, in the cylindrical vibration-damping device having the conventional structure, since the main rubber elastic body is subject to substantially pure compressive force between the opposing faces of the inner axial member and the outer cylindrical member, and what's more, the opposing faces of the inner axial member and the outer cylindrical member are each made to be an inclined plane in an arc shape that quickly varies its inclination angle from the apex to both sides in the circumferential direction, it was hard to fully achieve stiff spring characteristics and excellent durability at the same time. Especially because of the main rubber elastic body subject to substantially pure compressive force, there were some problems in setting the rubber volume large enough and fully maintaining the durability due to the concentration of high stresses at the time of load input coupled with the fact that the opposing faces of the inner axial member and the outer cylindrical member are made inclined in an arc shape in the circumferential direction.

In addition, since the main rubber elastic body is arranged between the opposing faces of the inner axial member and the outer cylindrical member in the main vibration input direction, there was a problem in finding a space for a stopper mechanism that provides a buffer to restrict relative displacement between the inner axial member and the outer cylindrical member between the opposing faces thereof in the main vibration input direction.

SUMMARY OF THE INVENTION

The present invention has been developed in view of the above-described matters as the background, and it is an object of the present invention to provide a cylindrical vibration-damping device with a novel structure which is able to maintain the spring ratio large enough in the two axis-perpendicular directions perpendicular to each other, and at the same time, to keep enough rubber volume of the main rubber elastic body and achieve improved durability.

The present invention also aims at providing a cylindrical vibration-damping device that is easily achievable with a simple design change by means of providing a stopper mechanism in the main vibration input direction as needed, although it is not necessarily essential.

The above and/or optional objects of this invention may be attained according to at least one of the following aspects of the invention. The following aspects and/or elements employed in each aspect of the invention may be adopted at any possible optional combinations.

A first aspect of the present invention provides a cylindrical vibration-damping device comprising: an inner axial member; an outer cylindrical member; and a main rubber elastic body connecting the inner axial member and the outer cylindrical member, wherein a pair of protruding portions are provided that protrude from the inner axial member on both sides thereof in an axis-perpendicular direction, and each protruding portion has a tapered shape thinning out toward its tip, and elastic connecting portions are constituted by the main rubber elastic body that connect both faces in a thickness direction of each protruding portion of the inner axial member to respective opposing faces of the outer cylindrical member.

In the cylindrical vibration-damping device of the present aspect, the elastic connecting portion is provided between the opposing faces of the inner axial member and the outer cylindrical member on both sides in the thickness direction in each of the pair of protruding portions, which enables to keep the rubber volume of the elastic connecting portion large enough. And, the durability of the elastic connecting portion can be ensured while the spring ratio is maintained in two axis-perpendicular directions of the pair of protruding portions, that is, the protruding direction and the direction perpendicular to it.

Especially due to the tapering off shape of each protrusion tip, the distance between the opposing faces of the inner peripheral face of the outer cylindrical member and the opposite face, and therefore the effective length of the elastic connecting portion, does not change abruptly from the base side of the protruding portion toward the tip side. Therefore, the concentration of stresses and strains is reduced or avoided at the elastic connecting portion at the time of vibration input, thus further improving the durability thereof.

A second aspect of the present invention provides the cylindrical vibration-damping device according to the first aspect, wherein the pair of protruding portions of the inner axial member protrude in a direction approximately perpendicular to a main vibration input direction, while an elastic center axis of each elastic connecting portion is set inclined with respect to the main vibration input direction.

In the cylindrical vibration-damping device of the present aspect, the main vibration input is prevented from working on the elastic connecting portion as a pure compressive force, thus reducing the stresses and strains at the elastic connecting portion at the time of vibration input to further improve the durability thereof.

A third aspect of the present invention provides the cylindrical vibration-damping device according to the first or second aspect, wherein the elastic connecting portion that connects opposing faces of the protruding portion and the outer cylindrical member has a difference in effective length of not more than 20% between a base side and a tip side of the protruding portion.

In the cylindrical vibration-damping device of the present aspect, by making the difference in the effective lengths of the elastic connecting portion small enough at not more than 20% across the entire length from the base side to tip side of the protruding portion, the concentration of stresses and strains at the elastic connecting portion at the time of vibration input is reduced more effectively, thus further improving the durability thereof.

A fourth aspect of the present invention provides the cylindrical vibration-damping device according to any of the first to third aspects, wherein an abutting protrusion is provided between opposing faces of the inner axial member and the outer cylindrical member in the main vibration input direction and is located circumferentially between the elastic connecting portions, while an abutting face of the abutting protrusion against at least one of the inner axial member and the outer cylindrical member is constituted by an abutting rubber portion substantially independent of the elastic connecting portions.

In the cylindrical vibration-damping device of the present aspect, the load-spring characteristics can be changed in the main vibration input direction in a nonlinear manner by having the inner axial member side and the outer cylindrical member side of the main rubber elastic body abut against each other via the abutting protrusion and abutting rubber portion after the main rubber elastic body is deformed in compression by a given amount so as to prevent excessive elastic deformation of the main rubber elastic body. This further improves the durability of the main rubber elastic body, while providing a buffer control function and the like to control relative displacement between the inner axial member and the outer cylindrical member.

Especially in the present aspect, the nonlinear adjustments of the load-spring characteristics can effectively be made by making good use of the space formed between the opposing faces of the inner axial member and the outer cylindrical member in the main vibration input direction and providing the abutting protrusion and the abutting rubber portion therein. It is possible either to form the abutting rubber portion so as to cover the protruding end face of the abutting protrusion by forming an abutting protrusion with a hard material from at least one of the inner axial member and the outer cylindrical member toward the other side, or to make the abutting rubber portion out of the protrusion tip of the abutting protrusion by forming the entire abutting protrusion integrally with the main rubber elastic body to make a rubber elastic body. Thus, by properly adjusting the material, hardness, protrusion height and the like of the abutting protrusion, the degree of design freedom of the load-spring characteristics can be improved.

A fifth aspect of the present invention provides the cylindrical vibration-damping device according to any of the first to fourth aspects, further comprising a separate stopper member attached to an axial end of the inner axial member, wherein an abutting cylindrical portion is provided at an axial end of the outer cylindrical member that is positioned in opposition to an outer peripheral face of the stopper member in the axis-perpendicular direction.

In the cylindrical vibration-damping device of the present aspect, by having the stopper member arranged at a position off the main rubber elastic body in the axial direction, it is made possible to efficiently achieve a stopper mechanism capable of surely limiting relative displacement between the inner axial member and the outer cylindrical member making good use of the outer cylindrical member without limiting the space for arranging the main rubber elastic body to be placed between the opposing faces of the protruding portion and the outer cylindrical member.

A sixth aspect of the present invention provides the cylindrical vibration-damping device according to the fifth aspect, wherein the inner axial member and the stopper member include respective central holes so that with a mounting rod inserted through the central holes, a fixing force is exerted on the inner axial member and stopper member under use, and the axial end of the inner axial member and the stopper member are temporarily fixed to each other by fitting portions in an axial direction provided at a plurality of locations on an outer peripheral side of the central holes.

In the cylindrical vibration-damping device of the present aspect, by ensuring the ultimate fixing force between the inner axial member and the stopper member by a mounting rod, it is made possible to simplify the structure that temporarily fixes the stopper member to the inner axial member during the assembly and transportation. Such temporary fixing structure can even be used to supplement the fixing forces of the mounting rod under end-user conditions.

A seventh aspect of the present invention provides the cylindrical vibration-damping device according to the sixth aspect, wherein both the inner axial member and the stopper member are constituted by extruded materials, the inner axial member and the stopper member include respective fitting holes formed by extrusion penetrating therethrough in the axial direction at locations corresponding to each other, and the fitting portions in the axial direction of the inner axial member and the stopper member are constituted by a fitting pin being pressed into and striding over the fitting holes of the inner axial member and the stopper member.

In the cylindrical vibration-damping device of the present aspect, the temporary fixing structure using the fitting pin is made even easier by composing the inner axial member and the stopper member by extruded materials.

An eighth aspect of the present invention provides the cylindrical vibration-damping device according to any of the fifth to seventh aspects, wherein the stopper member has an irregular cylindrical outer peripheral face with its protrusion height from the inner axial member in the axis-perpendicular direction varying along a circumference.

In the cylindrical vibration-damping device of the present aspect, it is made possible to properly set the stopper characteristics in various directions perpendicular to the central axis with a high degree of freedom by means of differentiating the protrusion height of the stopper member in the circumferential direction.

A ninth aspect of the present invention provides the cylindrical vibration-damping device according to any of the fifth to eighth aspects, wherein in a direction of protrusion of the protruding portion of the inner axial member, a protrusion height of the stopper member is made larger than that of the protruding portion, and a protrusion apex of the stopper member is formed with a larger curvature radius in a circumferential direction than that of a protrusion apex of the protruding portion.

In the cylindrical vibration-damping device of the present aspect, it is made possible to obtain the buffer stopper mechanism due to the effect of abutment of the stopper member against the outer cylindrical member side before the protruding portion gets abutted against the outer cylindrical member side. Especially by virtue of the stopper member formed with a larger curvature radius in the circumferential direction than that of the protruding portion in a tapered form thinning out toward the tip, it is made easier to set the abutment area large enough against the outer cylindrical member side, thus enabling to obtain excellent buffering effects.

A tenth aspect of the present invention provides the cylindrical vibration-damping device according to any of the fifth to ninth aspects, wherein the abutting cylindrical portion of the outer cylindrical member has a rubber buffer on its inner peripheral face opposing the stopper member, the rubber buffer being integrally formed with the main rubber elastic body.

In the cylindrical vibration-damping device of the present aspect, it is made possible to easily provide the rubber buffer on the abutting face of the stopper member against the outer cylindrical member by integrally forming it with the main rubber elastic body without forming the rubber buffer on the stopper member formed separately from the inner axial member.

According to the present invention, by providing the elastic connecting portion between the opposing faces of the pair of protruding portions in a tapered form thinning out toward the tip and the outer cylindrical member, it is made possible to set the spring ratio large enough in two axis-perpendicular directions, that is, the direction of protrusion of the pair of protruding portions and the perpendicular direction thereof.

Also, in the cylindrical vibration-damping device related to the fourth aspect of the present invention, it is made possible to achieve the mechanism to limit nonlinear spring characteristics and the amount of buffering displacement by making good use of the space between adjacent elastic connecting portions in the circumferential direction to provide the abutting protrusion.

Further, in the cylindrical vibration-damping device relating to the fifth aspect of the present invention, it is made possible to achieve the mechanism to limit relative displacement between the inner axial member and the outer cylindrical member in the axis-perpendicular direction by the stopper member arranged at a location off the main rubber elastic body in the axial direction without limiting the volume of the main rubber elastic body in the axial direction.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Embodiments of the present invention will be described below in reference to the drawings.

Figure 1:
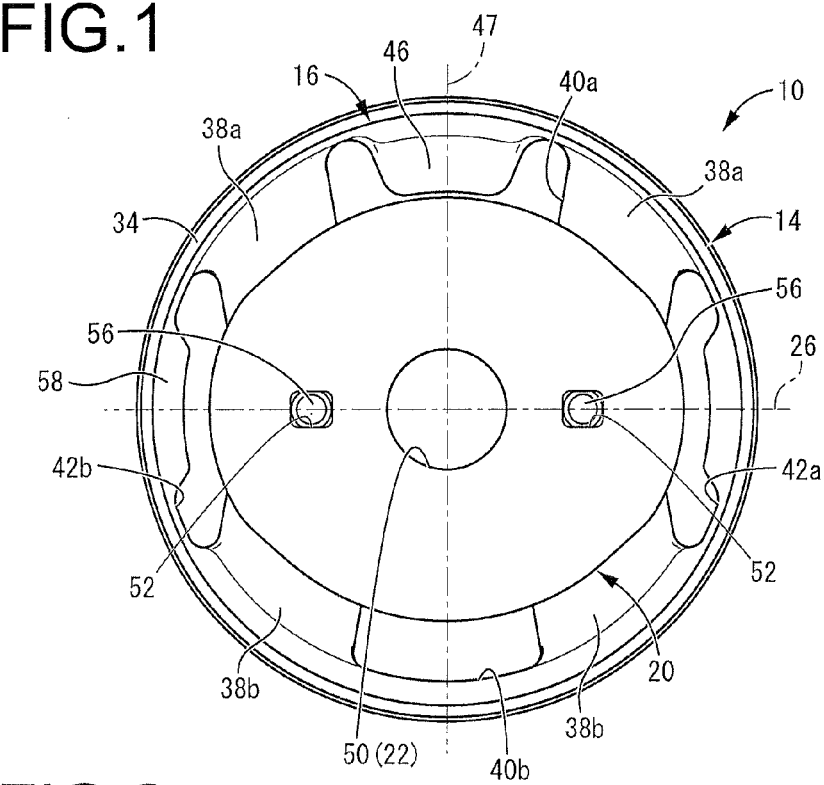
FIG. 1 is a front view of a cylindrical vibration-damping device as a first embodiment of the present invention representing the left-side view of FIG. 3.
Figure 2:
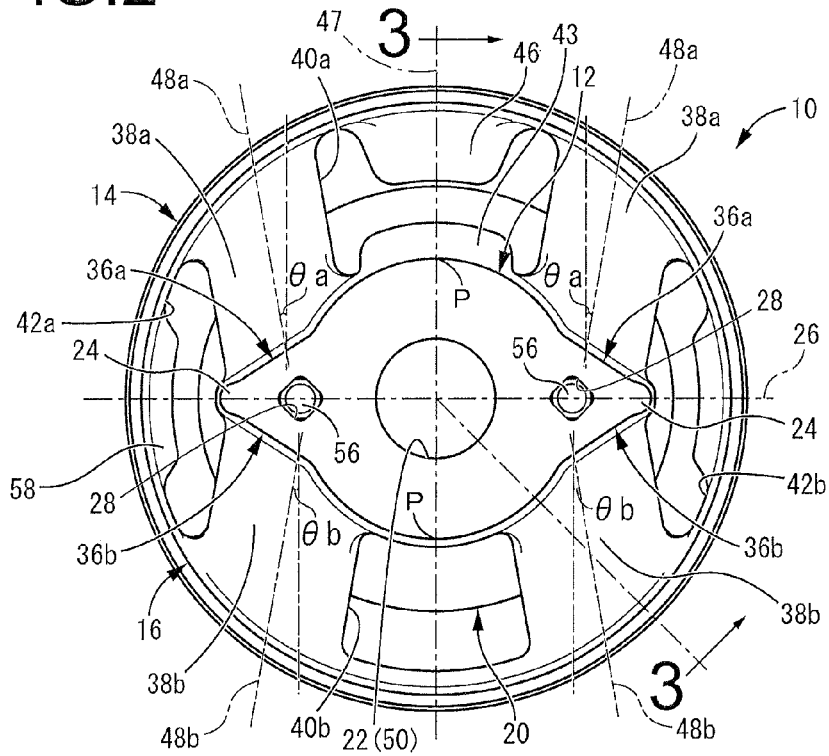
FIG. 2 is a rear view of the cylindrical vibration-damping device shown in FIG. 1 representing the right-side view of FIG. 3.
Figure 3:
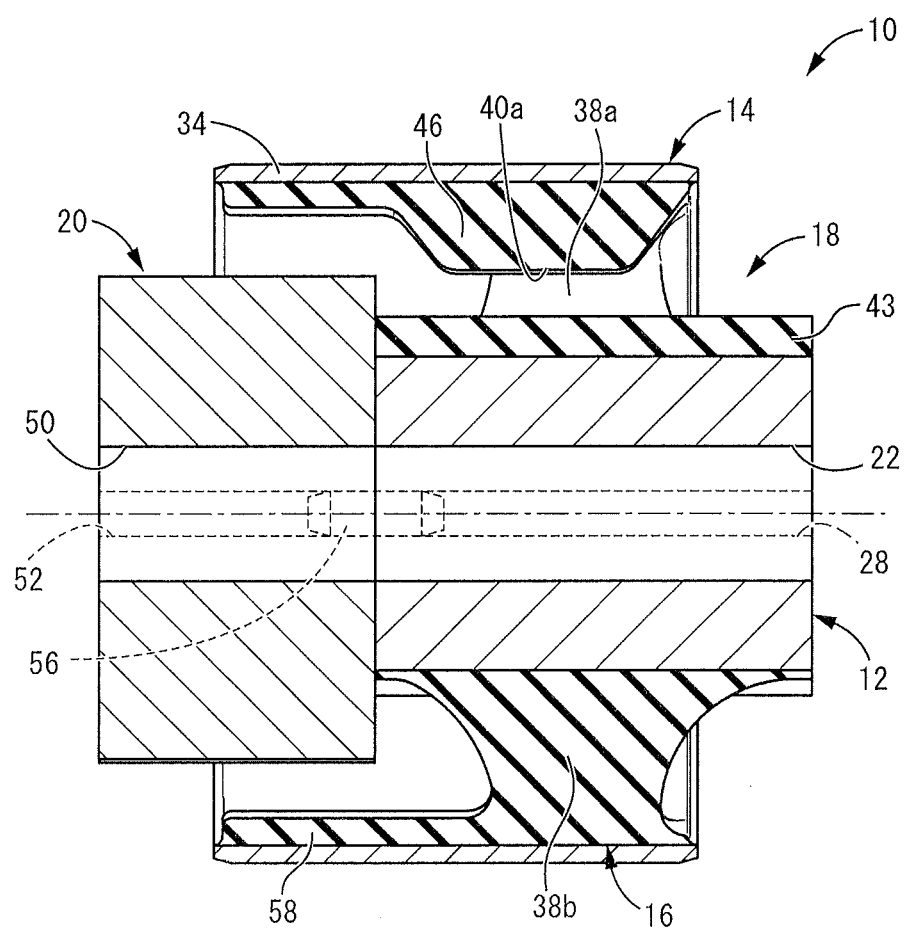
FIG. 3 is a cross sectional view taken along line 3-3 of FIG. 2.

FIGS. 1 to 3 show a differential mount 10 as an embodiment of the cylindrical vibration-damping device having the structure according to the present invention. The differential mount 10 has a structure where an inner axial member 12 and an outer cylindrical member 14 are elastically connected by a main rubber elastic body 16. Then a differential gear box is supported by the vehicular body in a vibration damping manner, for example by having the outer cylindrical member 14 pressed into a mounting hole provided on the differential gear box side of the vehicle, and by having a fixing rod such as a bolt that is fixed on the vehicular body side fitted by insertion into the inner axial member 12.

Figure 4:
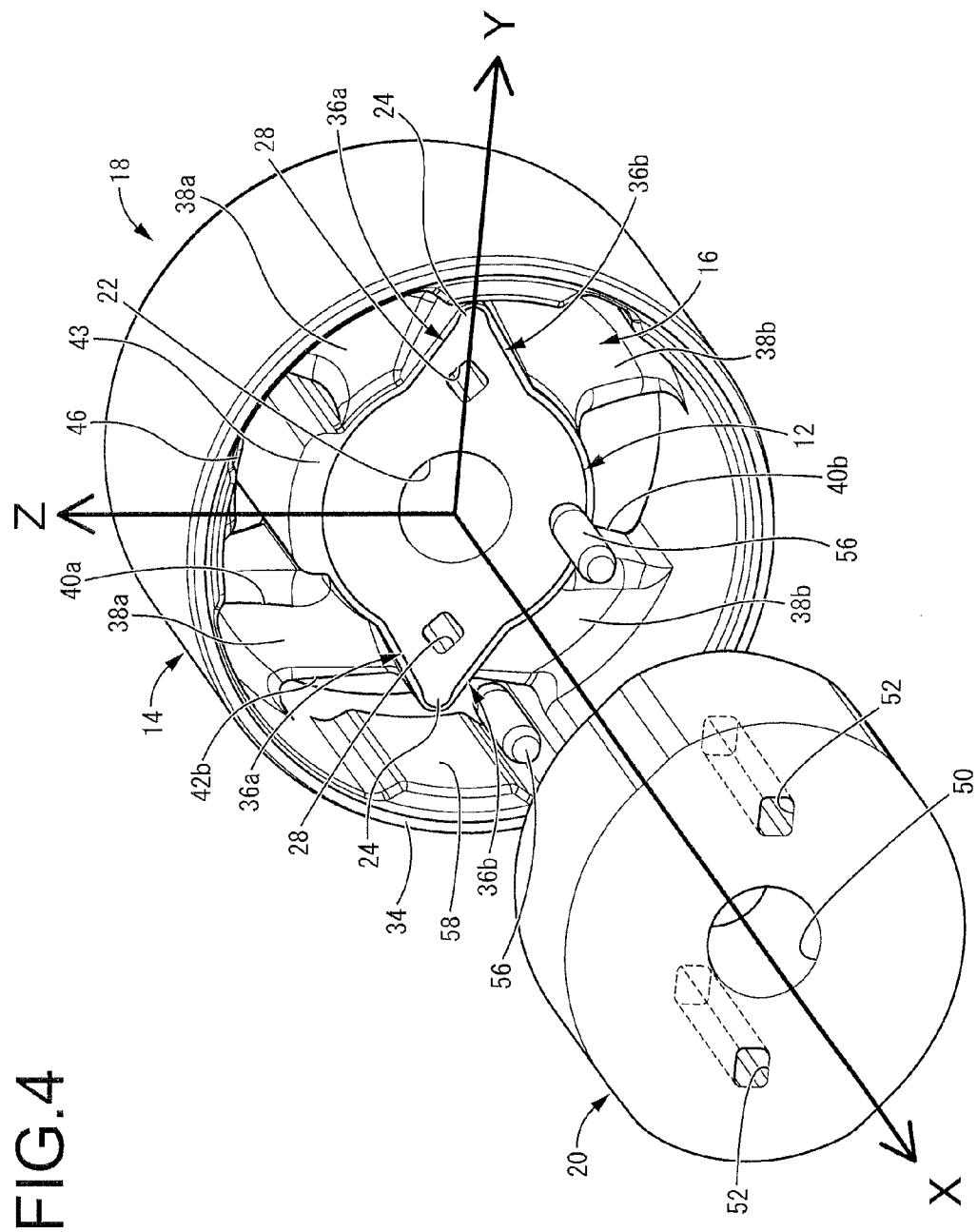
FIG. 4 is an exploded perspective view of the cylindrical vibration-damping device shown in FIG. 1.

More specifically, the differential mount 10, as shown in FIG. 4, has a structure where a separate stopper member 20 is assembled to a mount body 18. Such differential mount 10 is to be mounted in such a way, for example, that the mounting axis direction, which is the central axis direction of the inner axial member 12 as well as the outer cylindrical member 14, coincides with the front-back direction (X-direction), and the two orthogonal axial directions perpendicular to the mounting axis direction coincide with the left-right direction (Y-direction) and the up-down direction (Z-direction) of the vehicle.

Figure 5:
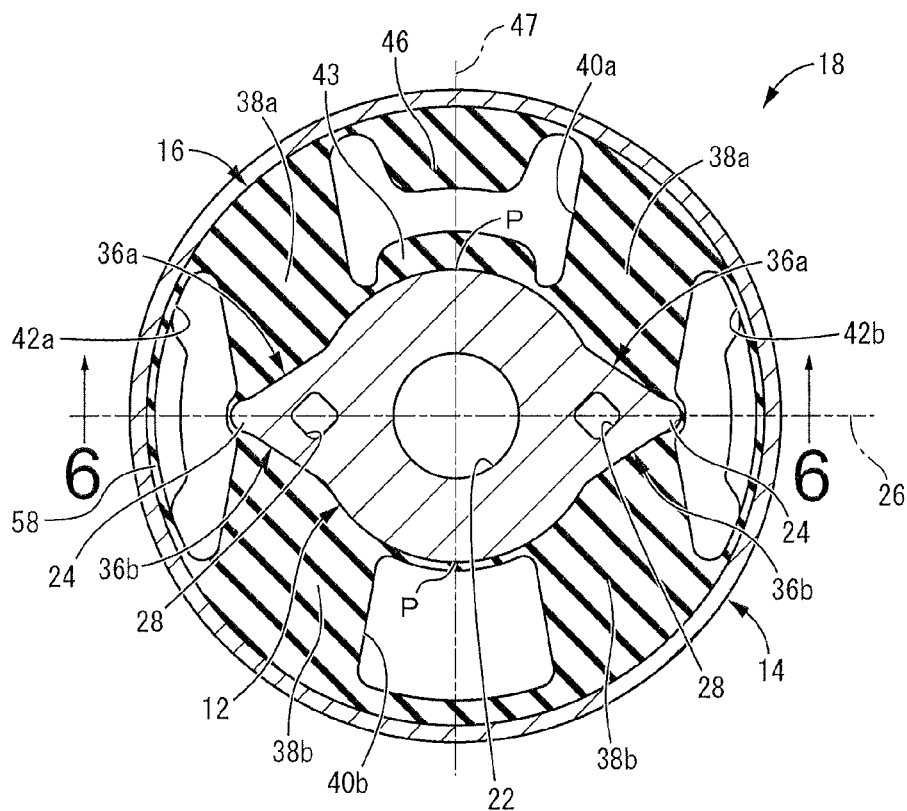
FIG. 5 is a cross-section of the integrally vulcanization-molded product constituting the cylindrical vibration-damping device shown in FIG. 1, which represents a cross sectional view taken along line 5-5 in FIG. 6.
Figure 6:
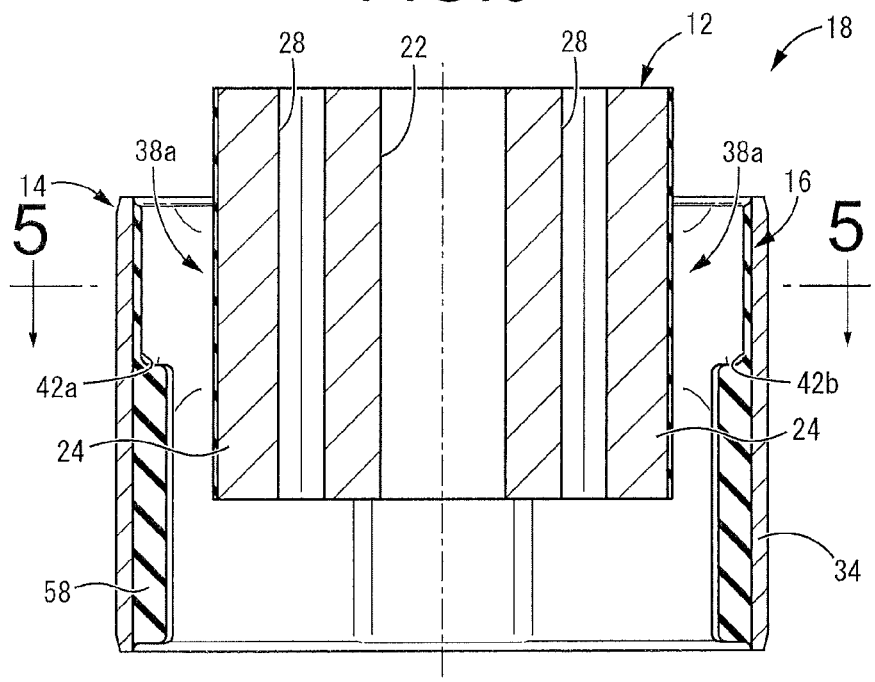
FIG. 6 is a cross sectional view taken along line 6-6 of FIG. 5.

The mount body 18, as shown in FIGS. 5 and 6, has the inner axial member 12 internally inserted into the outer cylindrical member 14 on approximately the same axis, wherein the outer peripheral face of the inner axial member 12 and the inner peripheral face of the outer cylindrical member 14 are elastically connected by the main rubber elastic body 16.

The inner axial member 12 is formed of a high-rigidity material such as metal, which is made by cutting an extruded material to a given length in the present embodiment. The cross-sectional shape of such extruded material is formed in a configuration that provides a pair of protruding portions 24, 24 protruding from the outer periphery on both sides in the radial direction, which is the left-right direction in FIG. 2 (Y-direction in FIG. 4), based on the form of a thick cylinder with a central hole 22 extending along the central axis.

Such protruding portion 24 has a cross-section that tapers off toward the protrusion tip with gradually decreasing width in the circumferential direction, which forms a chevron shape continuously extending all across the length in the axial direction. In the present embodiment, each protruding portion 24 has a cross-section symmetrical about a radial line 26 that extends in the protruding direction. Also, a fitting hole 28 is formed by extrusion penetrating through the base end of each protruding portion 24, which is located on the outer peripheral side of the central hole 22 on the radial line 26.

Meanwhile, the outer cylindrical member 14 is made in an approximate shape of a straight cylinder, which is formed by cutting a pipe material made of a high-rigidity material such as metal, for example, to a given length. In the present embodiment, the length of the outer cylindrical member 14 in the axial direction is made larger than that of the inner axial member 12.

Then the inner axial member 12 and the outer cylindrical member 14 are placed on approximately the same central axis in a state of being inserted internally and externally to be arranged with a space in between in axis-perpendicular directions all the way around the circumference. Also, under such arrangement conditions, the outer cylindrical member 14 extends one of its ends in the axial direction on the left side in FIG. 3 beyond the inner axial member 12 in the axial direction for a given length, and this extended portion constitutes an abutting cylindrical portion 34. On the other end side of the outer cylindrical member 14, the inner axial member 12 is placed to protrude out from the outer cylindrical member 14 in the axial direction.

Also, the inner axial member 12 and the outer cylindrical member 14 arranged as described above are elastically connected to each other by the main rubber elastic body 16 arranged between the opposing faces of both members 12, 14 in the axis-perpendicular direction. In the present embodiment, the main rubber elastic body 16 is made as an integrally vulcanization-molded product bonded by vulcanization to each of the outer peripheral face of the inner axial member 12 and the inner peripheral face of the outer cylindrical member 14, thus constituting the mount body 18.

The main rubber elastic body 16 described above has upper and lower connecting legs 38a, 38b serving as elastic connecting portions arranged between the opposing faces of inclined surfaces 36a, 36b on both sides of each protruding portion 24 in the circumferential direction (thickness direction) and the inner peripheral face of the outer cylindrical member 14 in the up-down direction in FIG. 2 (Z-direction in FIG. 4), which is the main vibration input direction.

This enables to form a pair of upper connecting legs 38a, 38a extending upward from inclined surfaces 36a, 36a on each upper side of the pair of protruding portions 24, 24 provided on the left and right sides of the central axis of the inner axial member 12 so as to be fixed to the inner peripheral face of the outer cylindrical member 14. Meanwhile, in the lower portion in FIG. 2, a pair of lower connecting legs 38b, 38b are formed extending downward from inclined surfaces 36b, 36b on each lower side of the pair of protruding portions 24, 24 provided on the left and right sides of the central axis of the inner axial member 12 so as to be fixed to the inner peripheral face of the outer cylindrical member 14.

Also, between the inner axial member 12 and the outer cylindrical member 14, upper and lower through voids 40a, 40b are formed between the pair of upper connecting legs 38a, 38a and between the pair of lower connecting legs 38b, 38b on the upper and lower sides respectively of the inner axial member 12 shown in FIG. 2 penetrating therethrough in the axial direction. Also, on the left and right sides of the inner axial member 12 in FIG. 2, left and right through voids 42a, 42b are each formed between the upper connecting leg 38a and the lower connecting leg 38b extending to penetrate therethrough in the axial direction.

Then in the upper through void 40a, an abutting protrusion 43 is formed to protrude from the inner axial member 12, while an abutting protrusion 46 is formed to protrude from the outer cylindrical member 14. These inner and outer abutting protrusions 43, 46 are placed to face each other at a given distance along a radial line 47 that is perpendicular to the direction of protrusion of the pair of protruding portions 24, 24. Also, in the present embodiment, the abutting protrusions 43, 46 are formed integrally with the main rubber elastic body 16 in their entirety so that the abutting rubber portions, working as abutting faces of the abutting protrusions 43, 46 against each other, are configured integrally at the respective opposing faces thereof. The abutting protrusions 43, 46 are connected to each connecting leg 38a only by a thin rubber with the thickness merely enough to cover the outer periphery of the inner axial member 12 and the inner periphery of the outer cylindrical member 14, and are formed in protrusion substantially in a manner independent of each connecting leg 38a.

Further, each pair of upper connecting legs 38a, 38a and lower connecting legs 38b, 38b extend in the direction of gradually spreading apart in the up and down directions in FIG. 2 from the inner axial member 12 toward the outer cylindrical member 14 in slight inclination against the Z-line, which is in the main vibration input direction.

Also, in the present embodiment, the circumferential dimension of the lower connecting legs 38b, 38b is made larger than that of the upper connecting legs 38a, 38a, but every connecting leg 38a/38b is formed so as to have a main elastic axis 48a/48b serving as an elastic center axis that extends linearly between the opposing faces of the inner axial member 12 and the outer cylindrical member 14. Such main elastic axis 48a/48b is preferably set inclined within a range of θ=0-30 degrees in the direction of spreading apart from the Z-line. Under these circumstances, assuming that the angle between a main elastic axis 48a of the upper connecting leg 38a and the Z-line is $\theta_a$ and the angle between a main elastic axis 48b of the lower connecting leg 38b and the Z-line is $\theta_b$, it is possible to set these $\theta_a$ and $\theta_b$ in accordance with each requirement of vibration damping characteristics.

Moreover, each connecting leg 38a/38b has its fixing parts to the inner axial member 12 set at positions off the apex P thereof in the main vibration input direction (Z-direction) on both sides in the circumferential direction. Especially among the fixing parts of each connecting leg 38a/38b to the inner axial member 12, the portions closer to the apex P are fixed to the arc-shaped outer peripheral face of the inner axial member 12, but the portions farther from the apex P are fixed to the inclined surface 36a/36b of the protruding portion 24. This makes it possible to set a large area on the supporting surface of each connecting leg 38a/38b on the side of the inner axial member 12 in the main vibration input direction, and thus to set the rubber volume of each connecting leg 38a/38b large enough while preventing the inclination angle from increasing drastically.

In addition, since the inclination angle of the protruding portion 24 of the inner axial member 12 along the inclined surface 36a/36b is made approximately equal to the inclination angle of the fixing surface between the connecting leg 38a/38b and the outer cylindrical member 14, the effective length of each connecting leg 38a/38b can be set approximately constant all the way around the circumference along the central axis of the mount. In preferred practice, each connecting leg 38a/38b has the difference in effective length of not more than 20% between the base side and the tip side of the protruding portion 24. This further reduces the local concentration of load inputs, and therefore, reduces the risk of developing cracks, thus improving the durability of the device.

Further, as shown in FIGS. 1 to 3, a separate stopper member 20 is assembled to the mount body 18 with the structure described above under a condition of being inserted into its abutting cylindrical portion 34.

Such stopper member 20 has a thick and circular block structure with an irregular outer peripheral face of approximately oval shape being formed of a high-rigidity material such as metal. In the present embodiment, it is formed by cutting an extruded material into a given length.

Also, a central hole 50 is formed in the stopper member 20 extending along the central axis thereof, and a pair of fitting holes 52, 52 are formed on the left and right sides of the central hole 50 as shown in FIG. 1. In the present embodiment, the central hole 50 and each fitting hole 52 are formed by extrusion each penetrating through the stopper member 20 in the axial direction.

In addition, the inner diameter of the central hole 22 of the inner axial member 12 is made equal to the central hole 50 of the stopper member 20, while the stopper member 20 is inserted into the abutting cylindrical portion 34 under a condition where the central axes of the inner axial member 12 and the stopper member 20 are overlapped with each other. This allows one axial end face of the stopper member 20 to be overlapped with an axial end face of the inner axial member 12 and the abutting cylindrical portion 34 to be positioned in opposition to the outer peripheral face of the stopper member 20 in the axis-perpendicular direction. Then, under such conditions of assembly, a fitting bolt or a mounting rod to the vehicle body (neither are shown) is inserted into each of the central holes 22, 50 of the inner axial member 12 and the stopper member 20 so that the inner axial member 12 and the stopper member 20 are fixed to each other due to the tightening force of the bolt.

Figure 7:
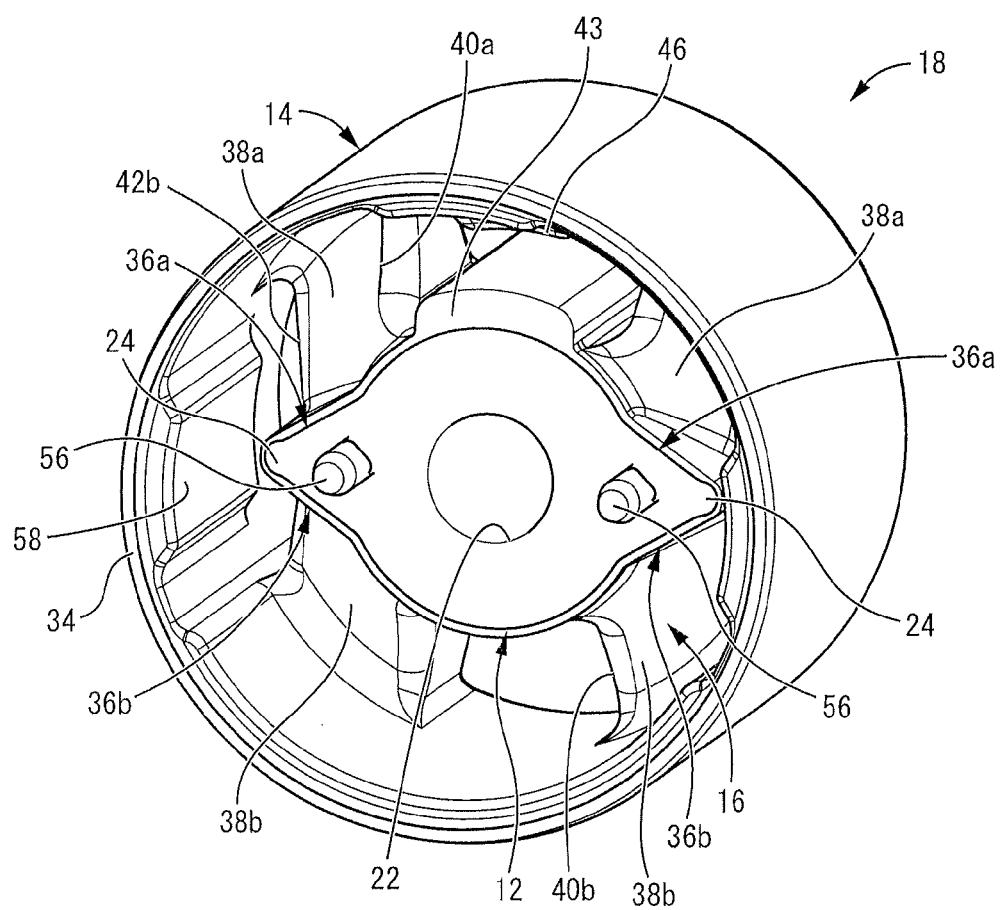
FIG. 7 is a perspective view of a stopper member in the integrally vulcanization-molded product shown in FIG. 5 in the pre-assembly state.

As shown in FIG. 3, one axial end face of the stopper member 20 is overlapped with an axial end face of the inner axial member 12, while the other end of the stopper member 20 is made to protrude beyond the outer cylindrical member 14 by a given length. Also, the pair of fitting holes 52, 52 of the stopper member 20 are provided at positions corresponding to the fitting holes 28, 28 of the inner axial member 12, and as shown in FIG. 7, fitting pins 56, 56 are pressed and fixed into both fitting holes 28, 52 so as to stride over them. Therefore, in the present embodiment, the fitting portion in the axial direction is configured by these fitting holes 28, 52 and the fitting pin 56, which allows the stopper member 20 to be temporarily fixed to the inner axial member 12 before mounting prior to the final fixing by the fixing bolt as described earlier.

Under these circumstances, the stopper member 20 protrudes out beyond the inner axial member 12 in the axis-perpendicular direction all the way around the circumference, while the outer diameter of the stopper member 20 is made smaller than that of the outer cylindrical member 14 along the entire circumference. Then, under a fixed condition of the stopper member 20 to the inner axial member 12 on the same central axis, a space is set up in every axis-perpendicular direction between the outer peripheral face of the stopper member 20 and the inner peripheral face of the outer cylindrical member 14. In addition, the outer peripheral configuration of the stopper member 20 can be designed according to the required stopper characteristics, and in the present embodiment, the outer periphery is made approximate in an irregular oval shape. This allows the protrusion heights of the stopper member 20 from the inner axial member 12 in the axis-perpendicular direction to be differentiated along the circumference, thus enabling to improve the degree of tuning freedom of the stopper characteristics.

This enables to limit relative displacement between the inner axial member 12 and the outer cylindrical member 14 in the axis-perpendicular direction by the abutment of the stopper member 20 against the outer cylindrical member 14. The abutting cylindrical portion 34 of the outer cylindrical member 14 positioned in opposition to the stopper member 20 in the axis-perpendicular direction has a rubber buffer 58 formed so as to cover the inner peripheral face thereof, which is integrally formed with the main rubber elastic body 16.

Especially along the opposing faces in the axis-perpendicular direction perpendicular to the main vibration input direction, the stopper member 20 protrudes out beyond the protruding portion 24 of the inner axial member 12, while the curvature radius in the circumferential direction of the outer periphery of the protrusion apex of the stopper member 20 constituting the abutting face is made larger than the curvature radius in the circumferential direction of the protrusion apex of the protruding portion 24. This prevents the protruding portion 24 of the inner axial member 12 from abutting against the outer cylindrical member 14. Additionally, in the present embodiment, the rubber buffer 58 is formed on the inner peripheral face of the outer cylindrical member 14 in a convex configuration of trapezoid protruding toward the inner periphery at each position of facing each other, which extends in the axial direction at a given length. This enables to improve the buffering effects of the rubber buffer 58.

The differential mount 10 with the structure described above has the pair of upper connecting legs 38a, 38a and the pair of lower connecting legs 38b, 38b that receive vibration loads in substantially compressive and tensional directions at the time of main vibration input in a state of being installed on a vehicle. Under these circumstances, the fixing face of each connecting leg 38a/38b on the side of the inner axial member 12 can be kept large enough while drastic changes in the inclination angle thereof are avoided due to each of the protruding portions 24, 24. As a result, maintenance of the rubber volume and reduction or avoidance of stresses and strains can effectively be achieved, thus realizing the intended spring characteristics with excellent durability.

Also, in the present embodiment, since the pair of upper connecting legs 38a, 38a and the pair of lower connecting legs 38b, 38b are each set inclined so as to gradually spread apart from each other in the up and down directions, and in part because of the inclined support surface of each connecting leg 38a/38b on the sides of the inner axial member 12 and the outer cylindrical member 14, a pure compressive force can be prevented from being exerted in response to the main input load. This enables to further improve the tuning freedom of the spring characteristics and the durability of the device.

In addition, since the pair of upper connecting legs 38a, 38a and the pair of lower connecting legs 38b, 38b are each set inclined so as to gradually spread apart from each other in the up and down directions, further improvements in the tuning freedom of the spring characteristics can easily be made by means of setting a ratio of compression strength to shearing strength for each connecting leg 38a/38b in the vibration input direction as well as in the direction perpendicular thereto.

Further, making the best use of the pair of upper connecting legs 38a, 38a, the abutting protrusions 43, 46 provided with the abutting rubber portion are formed, and an abutting means is set up between the inner axial member 12 and the outer cylindrical member 14 in the axis-perpendicular direction via the abutting protrusions 43, 46. This enables to ensure the tuning freedom of the nonlinear spring characteristics. In the upper portion of FIG. 2 located on one side of the main vibration input direction, the distance between the opposing faces of the abutting protrusions 43 and 46 is made smaller than that between the stopper member 20 and the outer cylindrical member 14. This enables to exert the nonlinear spring characteristics due to the abutment between the abutting protrusions 43, 46 within the stroke range of the stopper member 20 up to reaching the position of abutting against the outer cylindrical member 14.

Also, in the present embodiment, the stopper member 20 is made as a separate part, which is assembled later to the mount body 18. Under these circumstances, the stopper characteristics can easily be changed, for example by changing only the stopper member from one configuration to another.

Embodiments of the present invention have been described above, but the present invention is not limited to those specific descriptions. For example, by providing plurality of the fitting holes 28, 52 of the inner axial member 12 and the stopper member 20 and differentiating their intervals along the circumference, it is possible to prevent misassembly of the stopper member 20 to the mount body 18 in the up-down direction and the like. However, in the present invention, other aspects can be adopted wherein the stopper member 20 and the inner axial member 12 made separately are fixed to each other by means such as welding, or the stopper member 20 is formed integrally with the inner axial member 12, or otherwise no stopper member 20 is provided, and the fitting portion that temporarily fix the inner axial member 12 and the stopper member 20 to each other is not necessarily essential.

Also, the protruding portions 24, 24 of the inner axial member 12 can be provided by differentiating the inclination angle of the inclined surfaces 36a, 36b on both sides in the circumferential direction taking into account the required spring characteristics and the difference in configurations among upper and lower connecting legs 38a, 38b.

Further, in the embodiment described above, the abutting protrusions 43, 46 are formed only in the upper portion of the inner axial member 12 as shown in FIGS. 2 and 5, but those abutting protrusions can be provided only in the lower portion or both in the upper and lower portions of the inner axial member 12. However, the abutting protrusions 43, 46 are not essential for the present invention.

Moreover, the rubber buffer 58 on the inner peripheral face of the abutting cylindrical portion 34 of the outer cylindrical member can be provided with appropriate thickness on any position along the circumference, and the nonlinear characteristics in the axis-perpendicular direction can be given to the rubber buffer 58 based on the abutment of the stopper member 20 against the rubber buffer 58. Although a convex configuration of trapezoidal cross-section is formed in the rubber buffer 58 of the embodiment described above, various configurations can be adopted considering the burring effects, load-bearing performance, durability and the like such as waveform concave-convex configurations wherein the crest and trough portions extending in the axial direction are alternately provided along the circumference in a consecutive manner.

In addition, in consideration of the required load-bearing performance and the weight of the stopper member 20, lightening holes, for example, can be formed therein. The number and configuration of those lightening holes are not particularly limited.

Also, by means of assembling the stopper member on both sides of the inner axial member in the axial direction and extending the outer cylindrical member to both sides of the inner axial member in the axial direction to provide abutting protrusions, the stopper mechanism can be provided in plurality on both sides in the axial direction. This can result, for example, in enhanced displacement control functions in the prizing direction as well as improved load-bearing performance.

What is claimed is:

1. A cylindrical vibration-damping device comprising:
    an inner axial member;
    an outer cylindrical member;
    a main rubber elastic body connecting the inner axial member and the outer cylindrical member; and
    a separate stopper member attached to an axial end of the inner axial member, wherein:
    a pair of protruding portions are provided that protrude from the inner axial member on both sides thereof in an axis-perpendicular direction, and each protruding portion has a tapered shape thinning out toward its tip,
    the main rubber elastic body include elastic connecting portions that connect both faces in a thickness direction of each protruding portion of the inner axial member to respective opposing faces of the outer cylindrical member,
    an abutting cylindrical portion is provided at an axial end of the outer cylindrical member that is positioned in opposition to an outer peripheral face of the stopper member in the axis-perpendicular direction,
    the inner axial member and the stopper member include respective central holes so that with a mounting rod inserted through the central holes, a fixing force is exerted on the inner axial member and stopper member under use,
    the axial end of the inner axial member and the stopper member are temporarily fixed to each other by fitting portions in an axial direction provided at a plurality of locations on an outer peripheral side of the central holes,
    both the inner axial member and the stopper member are constituted by extruded materials,
    the inner axial member and the stopper member include respective fitting holes formed by extrusion penetrating therethrough in the axial direction at locations corresponding to each other, and
    the fitting portions in the axial direction of the inner axial member and the stopper member are constituted by a fitting pin being pressed into and striding over the fitting holes of the inner axial member and the stopper member.

2. The cylindrical vibration-damping device according to claim 1, wherein the pair of protruding portions of the inner axial member protrude in a direction approximately perpendicular to a main vibration input direction, while an elastic center axis of each elastic connecting portion is set inclined with respect to the main vibration input direction.

3. The cylindrical vibration-damping device according to claim 1, wherein the elastic connecting portion that connects opposing faces of the protruding portion and the outer cylindrical member has a difference in effective length of not more than 20% between a base side and a tip side of the protruding portion.

4. The cylindrical vibration-damping device according to claim 1, wherein an abutting protrusion is provided between opposing faces of the inner axial member and the outer cylindrical member in the main vibration input direction and is located circumferentially between the elastic connecting portions, while an abutting face of the abutting protrusion against at least one of the inner axial member and the outer cylindrical member is constituted by an abutting rubber portion substantially independent of the elastic connecting portions.

5. The cylindrical vibration-damping device according to claim 1, wherein the stopper member has an irregular cylindrical outer peripheral face with its protrusion height from the inner axial member in the axis-perpendicular direction varying along a circumference.

6. The cylindrical vibration-damping device according to claim 1, wherein in a direction of protrusion of the protruding portion of the inner axial member, a protrusion height of the stopper member is made larger than that of the protruding portion, and a protrusion apex of the stopper member is formed with a larger curvature radius in a circumferential direction than that of a protrusion apex of the protruding portion.

7. The cylindrical vibration-damping device according to claim 1, wherein the abutting cylindrical portion of the outer cylindrical member has a rubber buffer on its inner peripheral face opposing the stopper member, the rubber buffer being integrally formed with the main rubber elastic body.

8. A cylindrical vibration-damping device comprising:
   a cylindrical inner axial member;
   a cylindrical outer cylindrical member disposed externally about and coaxially with the inner axial member; and
   a main rubber elastic body connecting the inner axial member and the outer cylindrical member, wherein:
   a pair of protruding portions are provided that protrude from the inner axial member on both sides thereof in an axis-perpendicular direction, and each protruding portion has a tapered shape thinning out towards its tip,
   elastic connecting portions are constituted by the main rubber elastic body that connect both inclined surfaces in a thickness direction of each protruding portion of the inner axial member to respective opposing faces of the outer cylindrical member,
   the pair of protruding portions of the inner axial member protrude in a direction approximately perpendicular to a main vibration input direction, while an elastic center axis of each elastic connecting portion is set inclined with respect to the main vibration input direction,
   an inclination angle of the elastic center axis with respect to the main vibration input direction is within a range of 0 to 30 degrees, and
   each of the elastic connecting portions has a fixing part to the inner axial member, the fixing part including a first area fixed to an arc-shaped outer peripheral face of the inner axial member located outside in the direction approximately perpendicular to the main vibration input direction with respect to an apex of the inner axial member in the main vibration input direction, and a second area fixed to the inclined surface of the protruding portion that is located outside in the direction approximately perpendicular to the main vibration input direction with respect to the arc-shaped outer peripheral face of the inner axial member.

\* \* \* \* \*